United States Patent [19]

Quandt

[11] Patent Number: 5,193,331
[45] Date of Patent: Mar. 16, 1993

[54] LEGUME HARVESTER

[75] Inventor: Robert J. Quandt, Hudson, Wis.

[73] Assignee: Twin Technology Incorporated, Milwaukee, Wis.

[21] Appl. No.: 761,516

[22] Filed: Sep. 18, 1991

[51] Int. Cl.$^5$ ...................... A01D 45/22; A01D 45/24
[52] U.S. Cl. ...................................... 56/12.8; 56/14.5; 56/15.6; 56/130; 56/327.1; 56/DIG. 9
[58] Field of Search .................. 56/12.8, 14.5, 15.6, 56/16.6, 127, 130, 327.1, DIG. 9; 460/121, 129

[56] References Cited

U.S. PATENT DOCUMENTS

| Re. 27,674 | 6/1973 | Grether et al. | 56/327.1 |
|---|---|---|---|
| 1,943,284 | 1/1934 | Binau | 56/DIG. 9 X |
| 2,267,879 | 12/1941 | Tillitt | 56/327.1 X |
| 3,425,194 | 2/1969 | Stott et al. | 56/DIG. 9 X |
| 3,514,928 | 6/1970 | Kenyon et al. | 56/19 |
| 3,597,905 | 8/1971 | Jarrell | 56/11.9 |
| 3,721,075 | 3/1973 | Weiberg | 56/13.5 |
| 3,772,860 | 11/1973 | Weiberg | 56/13.5 |
| 4,147,017 | 4/1979 | Cortopassi et al. | 56/327.1 X |
| 4,261,163 | 4/1981 | Shaw | 56/327.1 |
| 4,266,391 | 5/1981 | McDuffie et al. | 56/14.5 |
| 4,287,707 | 9/1981 | Persoons et al. | 56/12.8 |
| 4,303,373 | 12/1981 | Polhemus | 56/12.8 |
| 5,029,436 | 7/1991 | Fredriksen et al. | 56/15.6 X |
| 5,077,964 | 1/1992 | Kabat | 56/327.1 |

OTHER PUBLICATIONS

*Pixall Beanstalker*, Pixall Corporation, Wisconsin, 1985.
Pixall One-Row Trac-Pix Brochure, Pixall Corporation, Wisconsin, 1991.
Byron 105 Brochure, Byron Enterprises, Inc., Byron, N.Y., 1990.

*Primary Examiner*—George A. Suchfield
*Attorney, Agent, or Firm*—Andrus, Sceales & Starke & Sawall

[57] ABSTRACT

A mechanical harvester is specifically designed for mechanically picking "gourmet-type" leguminous crops with hand-picked quality. The picking tools are a plurality of elongate resilient fingers which are disposed on an endless moving belt for gently combing the crop from the plants. The harvester is adapted to be placed behind a towing vechicle such as a tractor, with the crop pick-up point in vertical alignment with the main tractor axis for assuring proper positioning of the pick-up point relative to the surface and for assuring good operator visibility. A universal crop transfer system is adapted to receive a removable collection chamber and a removable and readily replaceable harvesting implement, whereby the harvester may be quickly modified for harvesting any one of a predetermined variety of leguminous crops. The harvester implement, collection chamber and transfer conveyor mechanism are all adapted to be mounted on a standard three-point hitch.

29 Claims, 4 Drawing Sheets

FIG. 2

LEGUME HARVESTER

BACKGROUND OF THE INVENTION

1. Field of the Invention

The subject invention is generally directed to crop harvesting equipment and is specifically directed to legume harvesters of the type adapted to be towed or mounted on self-propelled vehicles.

2. Description of the Prior Art

Many crops such as English peas, sugar snap peas, green soybeans, paprika and special gourmet varieties of green beans and other "gourmet-type" vegetable crops require a harvesting device that will produce a hand-picked quality vegetable. This is not possible with the known technology of the prior art.

The prior art harvesters for mechanical harvesting of leguminous vegetables such as green beans and English peas and the like generally comprise a plant alignment device which delivers the plant into a rotating drum with flexible steel fingers. As the device progresses toward the plant, the plants are directed into the flailing action of the drum fingers which strip the vegetable pods from the plants. In most instances, the rotating drum is also used as a conveyor apparatus for delivery of the plant material into subsequent transfer and collection devices. The concept of mechanical harvest of leguminous crops by the use of picking fingers on a rotating drum is acceptable for a very limited number of crops. These crops are either resilient enough to resist damage through the collection process or require further processing or are of the type where certain amounts of damage can be accepted. Where such techniques have been employed for "gourmet-type" vegetable crops, the damage and discard rate has approached 40% of harvested crops. This compares to a 10% or less discard rate for hand-picked crops. The improved discard rate of hand-picking continues to justify manual harvest under known conditions.

Examples of prior art devices are shown in U.S. Pat. No. 3,721,075 entitled "STRIPPING MACHINE" issued to R. Weiberg on Jul. 13, 1971; U.S. Pat. No. 3,597,905 entitled "POD-STRIPPING MACHINE", issued to V. Jarrell on Aug. 10, 1971; U.S. Pat. No. 3,772,860 entitled "HARVESTING MACHINE" issued to R. Weiberg on Nov. 20, 1973; and U.S. Pat. No. 3,514,928 entitled "BEAN HARVESTING MACHINE" issued to J. Kenyon et al on Jun. 2, 1970.

Products currently available using the generally known technology are manufactured by Pixall Corporation, Clear Lake, Wis. under the trademarks "BEAN STALKER" and "ONE-ROW TRACK-PICKS" and by Byron Enterprises, Inc., Byron, N.Y., under the model designation "BYRON 105".

SUMMARY OF THE INVENTION

The subject invention is directed to a legume harvester which is adapted to be mounted on and/or drawn by a towing vehicle with auxiliary power available for hydraulic and mechanical hook-up. An endless moving belt is fixed to the front portion of the harvester and is inclined to the ground to direct the plant into the pick-up area. An endless conveyor having picking implements or tools is mounted in the harvester and draws the plant from the pick-up area into the collection area, where the implements remove the crop to be harvested from the plant. The crops and any waste associated with the crops are then moved along the conveyor to a blower collection chamber which is adapted to collect the crop and transfer it to a collection station while separating the trash and exhausting it back onto the field. The speeds and positions of the conveyors are variable to adapt to various crops and conditions. A blower fan mounted in the collection chamber causes a negative pressure throughout the entire width of the collection belt for separating the trash from the pods as they gravity feed onto the collection conveyor. The collection conveyor is then in communication with standard-type conveyor systems for removing the collected and harvested crop from the system to a collection bin which also may be towed by the towing vehicle.

It is an important feature of the subject invention that at least one configuration of the collection belt include a picking tool comprising a plurality of resilient combing fingers particularly well suited for collecting legume crops with hand-picked quality for harvesting "gourmet-type" vegetables. In the preferred embodiment of the invention, it has been found that use of the picking implements of the subject invention provides consistent hand-picked quality for up to as much as 95% of the crops picked, in contrast to 60–70% by known prior mechanical methods. This greatly enhances the legume harvesting operation by achieving manual labor results at a fraction of the cost and at a greatly enhanced harvesting speed. In the preferred embodiment, the combing fingers are made of a resilient, flexible rubber material which combs through the plant without damaging the crops. They are spaced on the belt in such a manner as to harvest the crop while reducing the amount of trash collected with the crop. The use of the elongated belts minimizes the tendency of the legume vine to wrap around the picking drum, which is a problem with the prior art.

In the preferred embodiment of the invention, each comb finger has a substantially cylindrical, enlarged base which is approximately one-third the height of the finger. The base is secured directly to the belt. The top of the base terminates in a conical taper which culminates in a flexible cylindrical tip extending approximately one-sixth of the height of the finger. The comb fingers are arranged such that the plant is pulled through the picking area and stripped as the belt is driven to transfer the crop to the blower system.

The harvesting implement for specific crop may be readily and easily attached to and detached from a universal collection and transfer system. In the preferred embodiment, the collection chamber includes a mounting frame for releasably receiving the implement. The implement may be quickly installed by properly seating it on the frame and making power hook-ups.

The collection chamber is also universal and may be readily attached to and detached from a variety of transfer systems.

The harvesting system of the subject invention provides a legume harvester which is both versatile and efficient and is capable of harvesting "gourmet-type" legumes with hand-picked quality.

Therefore, it is an object and feature of the subject invention to provide for a legume harvester which is capable of harvesting "gourmet-type" vegetables with hand-picked quality.

It is a further object and feature of the subject invention to provide a harvesting device that will remove vegetable pods from a plant through the use of a gentle combing action.

It is another object and feature of the subject invention to provide a harvesting device that will deliver the detached vegetable pods to a subsequent conveyor through the use of a conveyor system.

It is yet another object and feature of the subject invention to provide a harvesting device that will separate the loose trash from the vegetable pods before delivery to the conveyor system by creating a negative pressure in a collection chamber to draw the trash from the heavier pods which are then dropped onto a transfer system.

It is yet another object and feature of the subject invention to provide a harvesting device that will operate efficiently on plants of different heights and varieties.

It is yet another object and feature of the subject invention to provide a harvesting device adjustable to adapt several vegetable crops with various pod sizes, shapes and fragility.

It is yet another object and feature of the subject invention to provide a harvesting device with the ability to sense ground contours and maintain a position off the ground automatically in direct response to the position of the main towing vehicle axle.

It is yet another object and feature of the subject invention to provide a harvesting device which will allow the operator good visibility of the conveyor and picking mechanisms for monitoring operations during use.

It is yet another object and feature of the subject invention to provide a harvesting device which is economical to manufacture, durable in use and refined in appearance.

Other objects and features of the subject invention will be readily apparent from the accompanying drawings and description of the preferred embodiment.

DETAILED DESCRIPTION OF THE PREFERRED EMBODIMENT

Figures 1, 8, 9:
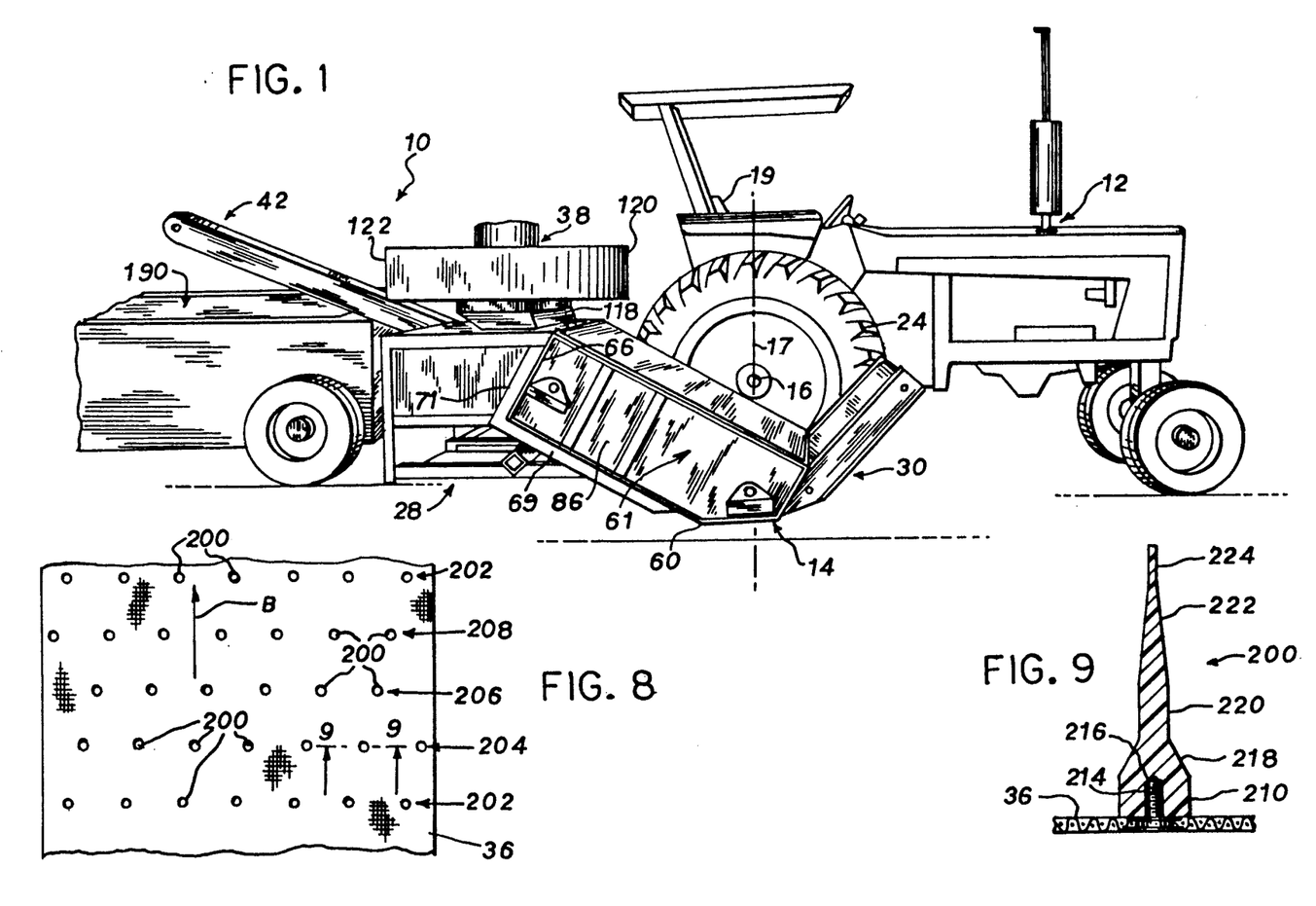
FIG. 1 is a perspective view of the legume harvester in accordance with the subject invention as shown attached to a typical vehicle.
FIG. 8 is a fragmentary section view looking generally in the direction of line 8—8 of FIG. 3.
FIG. 9 is an enlarged section view looking generally in the direction of line 9—9 of FIG. 8.

As generally shown in FIG. 1, the legume harvester 10 of the subject invention is adapted to be attached to the three-point hitch of a typical towing vehicle such as, by way of example, the tractor 12. It is an important feature of the subject invention that the pick-up point or intake point 14 of the legume harvester is in substantial vertical alignment with the main axle 16 of the tractor, as indicated by the line 17. This permits the pick-up point to ride with the tractor as it encounters irregularities in the terrain.

Figure 2:
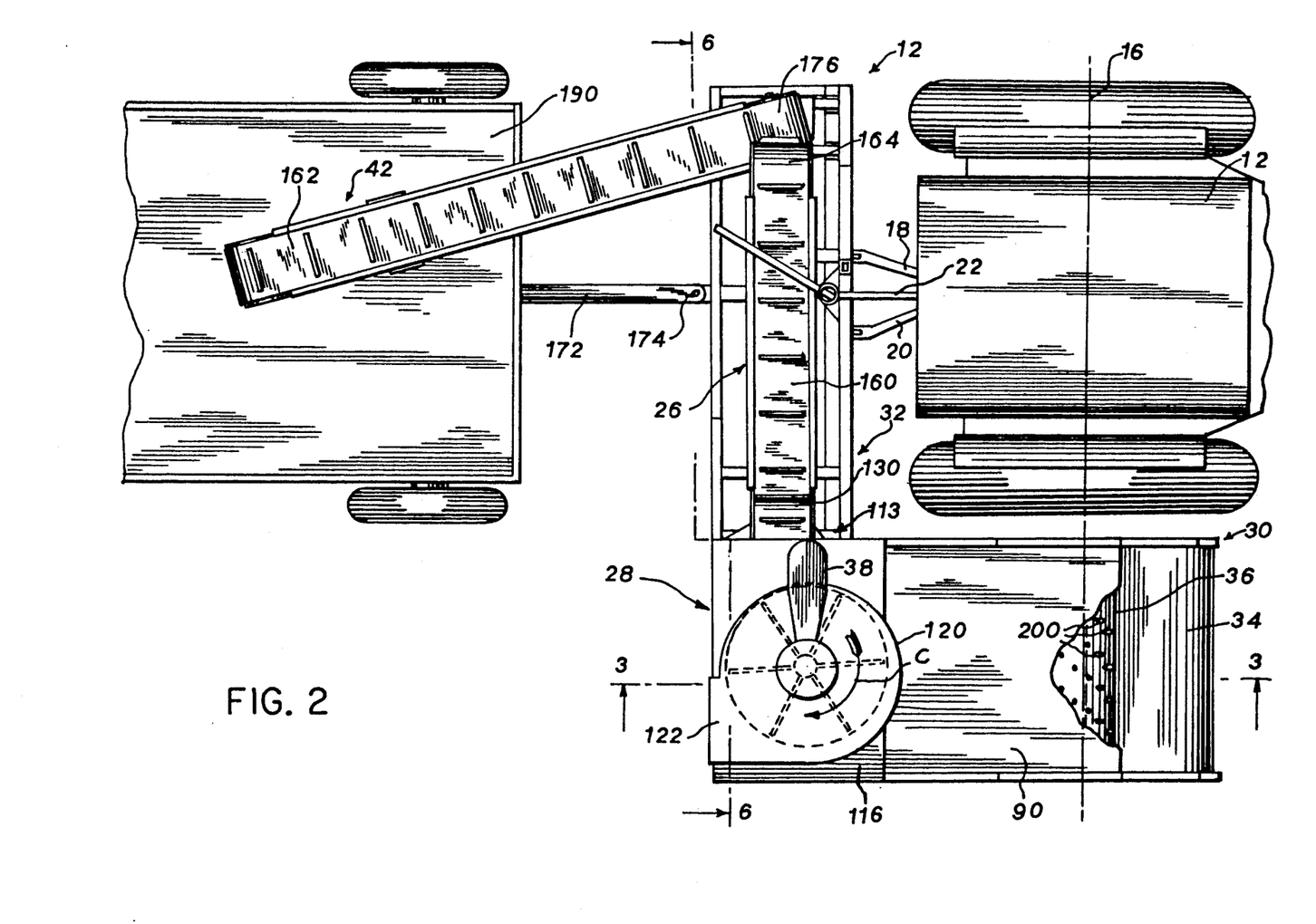
FIG. 2 is a top view of the legume harvester and vehicle of FIG. 1.

As is best shown in FIG. 2, the legume harvester of the preferred embodiment is adapted to be mounted on the tractor 12 via a standard three-point hitch as indicated by the braces 18, 20 and 22. This permits the legume harvester 10 to be rapidly attached to the tractor and permits positioning of the pick-up point 14 to be positioned relative to the wheel 24 of the tractor and the axle 16 by leveling and raising or lowering the hydraulic lift associated with the three-point hitch, as is typical on most farm tractors currently in use. This also places the pick-up point in good view of the operator, as indicated at 19, see FIG. 1.

The generally L-shaped design of the legume harvester comprising the main conveyor section 26, the collector/blower section 28 and the pick-up or harvesting implement 30 permits all of the external drive mechanisms to be positioned between the tractor 12 and the harvester 10 in the area generally designated by the arrow 32 (see FIG. 2), precluding or minimizing the likelihood of injury to operating personnel during operation. In the preferred embodiment, the harvester mechanism is driven by a standard hydraulic motor (not shown) which is driven by the tractor power supply in the well-known manner, for driving the feed-in conveyor 34 (FIG. 3), the harvesting conveyor 36, the blower mechanism 38, the transfer conveyor system 40 and the take-off conveyor 42 (FIG. 2), in the manner well-known to those skilled in the art.

Typically, the conveyors 34 and 36 are chain driven, wherein one of the rollers 44 for the pick-up conveyor and one of the rollers 46 for the feed-in conveyor are chain driven to rotate the conveyors in the direction indicated by the arrows A and B, respectively. As is typical, the remaining rollers 48 and 50 are free wheeling follower rollers for keeping the conveyor belts 34 and 36 in alignment and under proper tension.

Figures 3, 4, 5:
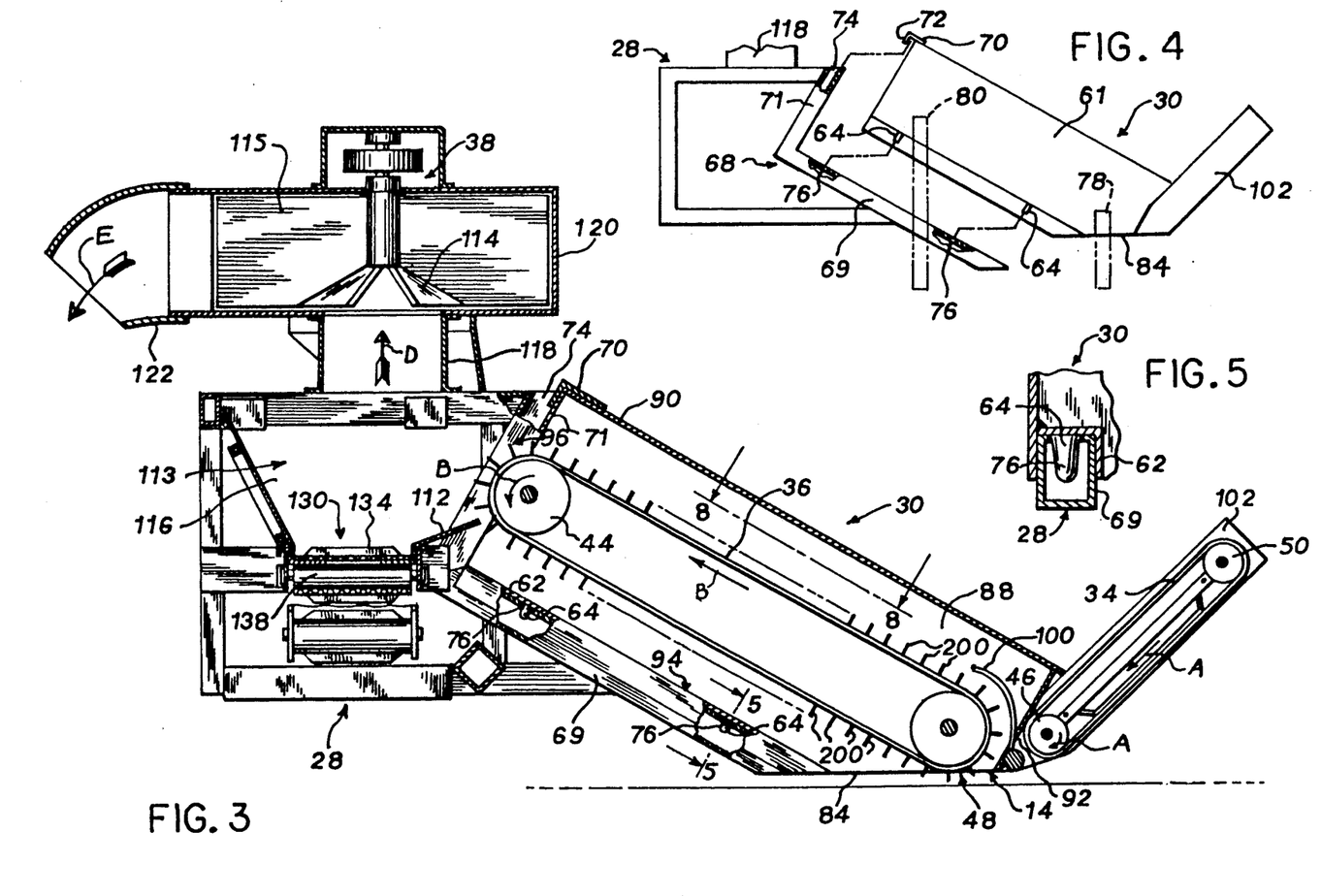
FIG. 3 is a section view taken generally along line 3—3 of FIG. 2.
FIG. 4 is a partial diagrammatic view looking in the same direction as FIG. 1 and illustrating the detachable implement for the harvester.
FIG. 5 is an enlarged, fragmentary section view taken generally along the line 5—5 of FIG. 3.
Figures 6, 7:
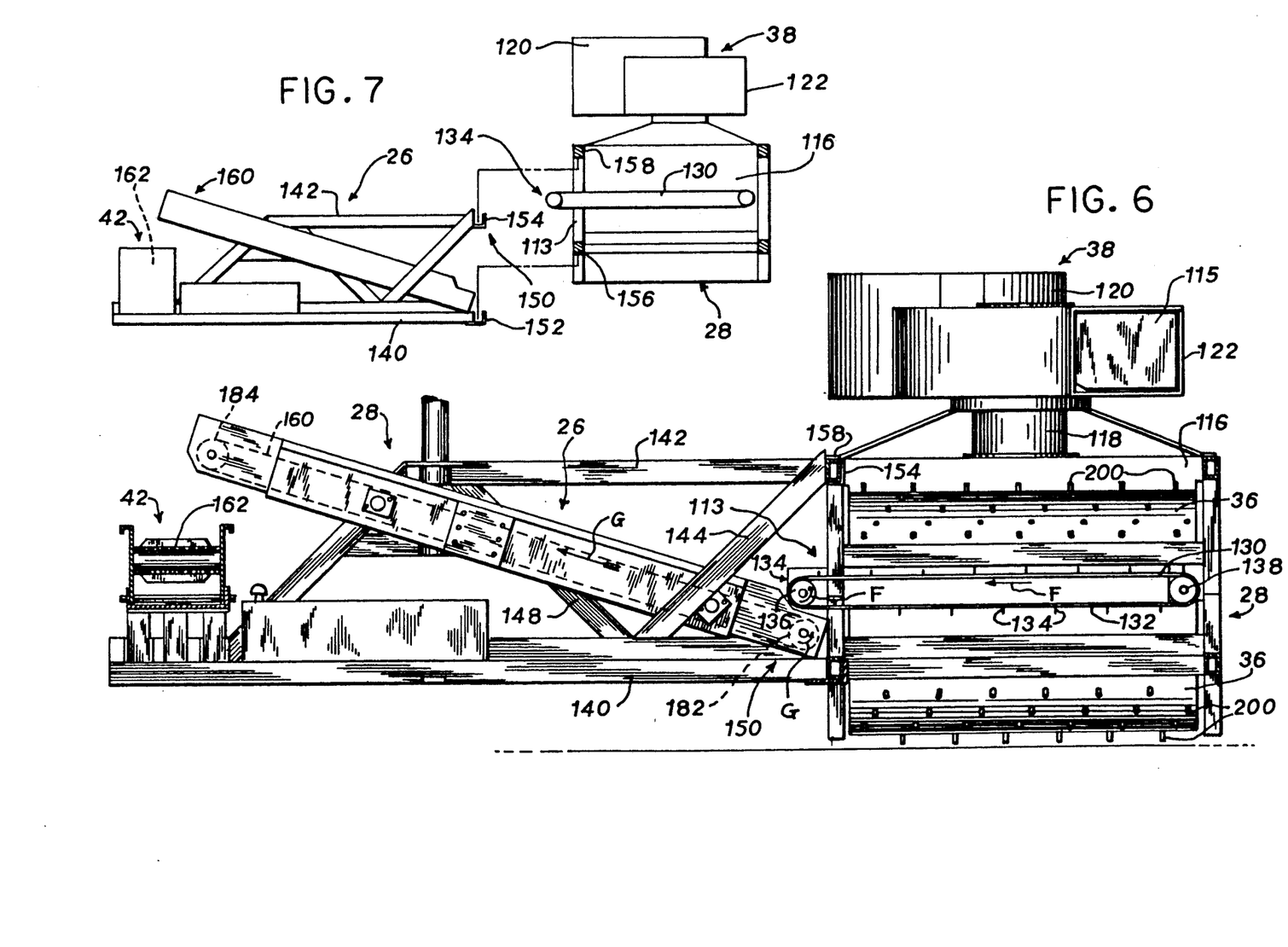
FIG. 6 is a section view taken generally along the line 6—6 of FIG. 2.
FIG. 7 is a diagrammatic rear view of the legume harvester looking generally in the same direction as FIG. 6 and showing the detachable conveyor system.

In the preferred embodiment, the harvester 10 of the subject invention comprises three separable components. The harvesting implement 30 is adapted to be quick hitched to the collection/blower mechanism 28, as is generally shown in FIG. 4. The collection/blower mechanism 28 is adapted to be attached to and removed from the conveyor system 26, as generally shown in FIG. 7. This permits very versatile use of the legume harvester, permitting it to be utilized with a variety of transfer systems 26 and permitting the implement 30 to be readily changed-out for harvesting different crops.

It is a feature of the preferred embodiment that the specific collection belt 36 described herein is well adapted for harvesting edible pod type peas, snap peas, green beans, cherry peppers and jalepeno peppers and the like. However, it will be readily understood that the harvester implement 30 can be readily adapted to harvest other types of legumes in the manner well known in the art by replacing the specific belt 36 with harvester heads suitable for other types of products. Examples of known technology for harvesting other products are the Byron 105 Bean Harvester and the Bryon 103 Sweet Corn Harvester manufactured by Byron Enterprises, Inc., Byron, N.Y.; and the Pixall Bean Stalker and Pixall Corn Heads as manufactured by Pixall, Clear Lake, Wis.

With specific reference to FIGS. 1, 3, 4 and 5, it will be seen that the harvester implement 30 comprises an outer frame 60 having a pair of outer, substantially vertical, laterally spaced side walls 61, each supported by an inclined lower brace 62. The collection belt or harvester system comprising the collection belt 36, typical belt drive mechanism and belt support structure are mounted within the frame between the side walls 61. A plurality of projecting pins 64 are welded to and depend from the lower braces 62, as is particularly shown in FIGS. 3 and 5. The end wall edge 66 of the side walls 61 serve as a locator for mounting and aligning the harvester implement 30 on the collection chamber assembly 28.

The forward end of the collecting chamber assembly 28 includes an L-shaped support frame 68 which is adapted for receiving the harvester implement 30, as is shown in FIG. 4. In the preferred embodiment, the support frame 68 includes a pair of laterally spaced inclined angle braces 69 adapted to receive and support the mated lower braces 62 of the implement 30. The support frame 68 also includes a pair of upstanding, laterally spaced angle braces 71 for receiving and acting as a positive stop for the mated end edges 66 of the side walls 61. An L-shaped mounting bracket 70 is secured to the upper rearward corner of the harvester implement 30 at the top edge of side walls 61 (see FIGS. 3 and 9) and includes a depending tab 72 which is adapted to be received in the hollow interior 74 of the upstanding angle braces 71 for mounting and aligning the upper end of the harvester implement 30 in the collection chamber assembly.

The lower braces 69 of the mounting frame 68 include a plurality of mounting holes or sockets 76, as is particularly shown in FIGS. 3, 4 and 5. In the preferred embodiment, the harvester implement 30 is adapted to be placed on the frame 68 with the tab 72 engaged in the upper end of the frame and with the mounting posts 64 received in the receptive sockets 76. Once installed in this manner, the harvester implement is ready for operation as soon as the drive rollers 44 and 46 are connected to the drive train (not shown) associated with the collection assembly and the tractor, in typical manner, for driving the feed-in belt 34 and the harvester belt 36.

In the preferred embodiment, the harvester implement 30 includes a set of removable legs 78 and 80 releasably attached to each side wall 61, as shown in phantom in FIG. 4. When not in use, the harvester 30 can be positioned on the legs 78 and 80 such that the harvester may be stowed in the inclined operating position. This permits the collection chamber assembly 28 to be moved into position under the implement 30 for aligning the mounting pins 74 with the sockets 76 and the mounting tab 72 with frame 71, after which the harvester assembly may be properly mounted on the collection chamber assembly by lifting the entire assembly with the hydraulic lift provided on the tractor. At this point, the removable legs 78 and 80 may be removed and the harvester implement is ready for use once mechanical and power hook-ups are made.

In the preferred embodiment, the harvester belt 36 extends the entire length of the harvester implement 30 (see FIG. 3) and includes a horizontal path or swath (see FIG. 2) which spans the entire pickup opening 84 (FIG. 3) which extends across the bottom of the harvester implement, (see also FIGS. 4 and 6).

In the preferred embodiment, the main section of the harvester implement 30 comprises a closed box having outer side walls 61 (FIG. 2), a closed top 90 (FIGS. 2 and 3), a substantially closed front wall 92, and an open bottom 84. The horizontal, open portion of the bottom 84 defines the opening which is the harvest pickup point 14. The rear of the harvester implement box is substantially open at 96, see FIG. 3. The belt 36 extends through the opening 96 and partially into the collection chamber 28. An arcuate deflector shield 100 is mounted in substantially concentric relationship with the follower roller 48 of the belt drive and is disposed forwardly of the belt and the pick-up opening 84.

The feed-in belt 34 is disposed forwardly of the front wall 92 and is inclined upwardly at an angle substantially orthogonal to the plane of the upper surface 37 of belt 36. The feed-in belt 34 is adapted to engage the crop as the entire assembly moves forward through the field to be harvested. In the preferred embodiment, the feed-in belt is mounted in a frame 102 and is driven by the drive roller 46 in the direction of arrow A. This causes the top of the crop, as it is encountered, to be driven downwardly toward the ground, where it is fed under the deflector shield 100 and into the pick-up opening 14. As the collection belt 36 rotates in the direction of arrow B, the pickup fingers 200 engage and pull the plant into the space between the belt 36 and the deflector shield 100 and into the harvester implement, where the fingers are operable to comb the crop from the plant. Using the feed-in belt 34 in this manner assures that the top of the crop first enters the pick-up point, before the root section of the crop, greatly facilitating the removal of the crop from the plant and greatly reducing the amount of trash collected with the harvested crop.

In the preferred embodiment, the harvester belt 36 rotates about the wheel rollers 44 and 48, and deposits the harvested crop and any trash picked up in the harvesting process, including such as, by way of example, leaves, stems and other plant parts, onto the receiving table or tray 112 (FIG. 3) provided at the open front end of the collection chamber assembly 28. The assembly 28 is best shown in FIGS. 2, 3 and 7 and comprises a substantially closed collection box defining a main chamber 116 having a front open end defined by the framework 68 for holding the harvester implement 30. The blower mechanism 38 includes a blower 114 mounted above the collection box and in communication with the main chamber 116 via the ducting arrangement comprising the vertical duct 118, the plenum 120 and the exhaust port duct 122. In the typical fashion, the blower is designed to rotate in the direction of the arrow C (see FIG. 2) for drawing light trash material deposited in the chamber 116 upwardly into the plenum 120 in the direction of arrow D (see FIG. 3). The trash thus collected in the plenum 120 is then pushed through the plenum 120 and out through the exhaust port duct 122, as indicated by arrow E, where it is returned to the field, in the manner well known. As best shown in FIGS. 1, 2 and 3, the blower includes spaced, substantially vertical blades 115 which substantially span the entire width and height of the plenum 120 to assure good suction across the entire main chamber 116.

A substantially horizontal conveyor system 130 is mounted to the collection box inside the chamber 116 and is adapted for receiving the crop which is deposited by the belt 36 onto the tray 112. As the crop is introduced on the conveyor, the conveyor is adapted to transfer the crop in the direction of the arrow F (see FIG. 6) through the open side wall 113 of the chamber box. In the preferred embodiment, the conveyor system 130 comprises a transfer belt 132 having a plurality of raised plates 134 for carrying the crop to an exit point 134. In typical fashion, the conveyor 132 is carried by a pair of rollers 136 and 138 which both support the conveyor belt 132 and drive it in the direction of arrow F for transferring the crop. As is typical, roller 136 is driven by the hydraulic power system used to drive the harvester implement and blower, and roller 138 is a free-wheeling follower roller for supporting the belt and controlling the tension.

As is best shown in FIG. 7, the entire collection chamber assembly 28 is adapted to be hung from and removably attached to the main transfer conveyor assembly 26. As there shown, the main transfer system 26 is carried in a frame including a pair of horizontal structural braces 140 and 142 and appropriate cross bracing as shown at 144 and 148. The main transfer conveyor 160 extends laterally and upwardly away from the collection chamber assembly 28 to transfer the harvested crop. The blower adjacent end 150 of the main transfer conveyor frame includes a pair of elongate L-shaped mounting brackets 152 and 154 which are adapted to receive the frame members 156 and 158 at the exit opening 113 of the collection chamber assembly, see also FIG. 6. The entire assembly is secured to the main transfer assembly by placing the structural frame members 156 and 158 in the respective receptive L-shaped channel brackets 152 and 154 on the conveyor transfer frame. Thus, the blower assembly and conveyor transfer assembly may be used with a variety of systems to accommodate the varying needs of the user.

In the preferred embodiment, the main transfer system 26 includes the elongate, inclined conveyor 160, as is best shown in FIGS. 2, 6 and 7. A secondary transfer conveyor 162 is mounted underneath the inclined exit end 164 of the main transfer conveyor 160 and is adjustable, to direct the harvested crop into a receiving bin such as that provided by the trailer or wagon 190 which is towed by the conveyor transfer assembly via tongue 172 and hitch 174, as is diagrammatically illustrated in FIG. 2. As is typical, and well known to those skilled in the art, the take-off conveyor system 42 may be raised or lowered in typical fashion or rotated about the pivot point 176, to accommodate both rear loading and side loading, as desired.

As is best shown in FIG. 6, the main take-off conveyor 160 is mounted in the framework of the conveyor system 26, with the blower adjacent end 150 being disposed beneath and inwardly of the exit point 134 of the conveyor 132. As is typical, the opposite end 164 of the main conveyor 160 is inclined and mounted above the pick-off conveyor 162. The main conveyor 160 may be driven and supported by a pair of rollers 182 and 184, and is driven in the direction of arrow G (FIG. 6). In the preferred embodiment, the roller 182 is driven by the hydraulic power supply provided by the towing vehicle and the roller 184 is a free-wheeling follower roller for aligning and adjusting the tension of the conveyor belt. It will be understood that the pick-off conveyor 162 is similarly mounted and driven, in the manner well known.

Turning now to FIGS. 8 and 9, the specific harvester implement 30 shown in the drawings is uniquely adapted for harvesting sugar snap peas, green soybeans, paprika and special gourmet varieties of green beans and other "gourmet-type" vegetable crops which require a harvesting device that will produce a hand-picked quality vegetable. This is accomplished by incorporating a combing finger 200 as particularly shown in FIG. 9. As shown in FIG. 8, the combing fingers are arranged in rows 202, 204, 206 and 208 such that row 202 is slightly offset with respect to row 204 and so on, with the sequence repeating again every fifth row. The effective space between the combing fingers in the preferred embodiment is $\frac{3}{4}$ of an inch while the collection belt 36 moves in the direction of arrow B through the plant at the pick-up point 14 in the front bottom of the harvester (see FIG. 3). The specific spacing of the combing fingers 200 may be altered as required depending on the crop to be harvested.

As best shown in FIG. 9, the combing fingers are made of a resilient, soft rubber, molded construction, with an enlarged base 210 which is adapted to be mounted on the belt 36 via a fastener such as the threaded fastener 214 which is secured to the belt 36 in typical fashion. In the preferred embodiment, the fasteners 214 are self-threading and are received in a self-tapping hole 216 in the center of the base 210 of the combing finger. A truncated conical transition section 218 is disposed above the base and terminates in a substantially cylindrical shank 220. The shank 220, transition section 218 and base 210 comprise approximately $\frac{1}{3}$ of the length of the finger. The finger includes a tapered section 222 which, in the preferred embodiment, is a cone having an angle of taper of taper of approximately 15 degrees relative to the finger axis, the taper section 222 comprising approximately $\frac{1}{2}$ of the total length of the finger and terminating in a short cylindrical tip 224 which is approximately 1/6 of the length of the finger. In the preferred embodiment, the base section 210 is approximately 1 inch in diameter, the shank 220 is approximately 0.375 inch in diameter, and the tip 224 is approximately 0.025 inch in diameter. The finger is approximately 5 inches long.

As the belt 36 rotates in the direction of arrow B and the combing fingers 200 move downwardly along the bottom run of the belt, as shown in FIG. 3, toward the pick-up opening 14, the combing fingers 200 begin to strip the pods from the plant and gather the plants upward and rearward around the roller 48 and toward the collection area. The shield 100 mounted in front of the roller 48 is adjustable to provide a minimum clearance equal substantially to the largest vegetable pod size and is maintained in position to prevent droppage of loose pods onto the ground. The shield also directs the crop into the collection area between the roller 48 and the interior wall of the shield, and upwardly in the direction of arrow B (FIG. 3) toward the top of the conveyor area where it is exited into the collection chamber 116. The velocity of the belt 36 is adjusted relative to the velocity of the belt 34 to provide various resistance to the combing action which may needed for variations in crops and crop conditions. As the belt 36 advances, the plants are fed into the implement and the fingers generate a gentle combing action for removing the crop from the plants.

The rearward end of the collection belt is, as described, located in communication with the collection chamber 116, whereby the heavier pods drop onto the collection chamber conveyor 40 and the lighter trash materials are drawn by the blower 114 in the direction of arrow D through duct 118 and exited through the exhaust duct 122 in the direction of arrow E. The harvested pods are deposited on the collection chamber conveyor system 130 and transferred out of the chamber 116 onto the main transfer conveyor 160 from which the harvested pods are removed from the system into a receiving bin such as, by way of example, the bin of wagon 190.

In the preferred embodiment of the invention, the feed-in plant alignment belt 34 is approximately 72 inches in length and covers the entire width of the pickup opening 84. A rubber or PVC belt has been found to be acceptable for this use. The main collection belt 36 is approximately 100 inches in length and is also the full width of the opening 84. This belt is approximately ¼ inch thick. Generally, a rubber belt has been found to be very successful.

While specific features and embodiment of the invention have been described herein, it will be readily understood that the invention encompasses all enhancements and modifications within the scope and spirit of the following claims.

I claim:

1. A crop harvester of the type adapted to be releasably secured to and powered by a motive vehicle such as a tractor for machine harvesting crops, the harvester comprising:
   a. a universal collector and transfer mechanism including means for collecting the harvested crop, means for separating trash therefrom and means for conveying the collected, separated crop to a remote receiving station, the universal collector and transfer mechanism adapted to be releasably secured to the vehicle; and
   b. a harvesting implement releasably mounted on the universal collector and transfer mechanism and adapted for harvesting a predetermined crop from a plant and including means for delivering the crop to the collector and transfer mechanism.

2. The crop harvester of claim 1, the universal collector and transfer mechanism further comprising:
   a. a collector system comprising a substantially closed collection chamber having an input opening in communication with the harvesting implement and an output opening in communication with the conveying means;
   b. means associated with the collection chamber for generating a negative, upwardly flowing pressure therein for drawing the trash associated with the crop upwardly and away from the crop;
   c. means associated with the negative pressure means for exhausting the separated trash from the collection chamber; and
   d. collector conveyance means in said chamber for conveying the crop from the input opening to the output opening.

3. The crop harvester of claim 2, wherein the collector system is releasably secured to the means for conveying the collected, separated crop to the remote receiving station.

4. The crop harvester of claim 2, wherein the negative pressure means further comprises a plenum mounted above the chamber, a powered blower in said plenum for creating a negative pressure side and a positive pressure side thereon, and means communicating the negative pressure side of plenum with the chamber for generating an upward draw therein; and wherein trash exhaust means comprises an exhaust port in the plenum on the positive pressure side of said blower.

5. The crop harvester of claim 2, wherein the collector conveyance means is a substantially horizontal, continuously moving conveyor for defining a moving table for advancing collected crop from the input opening to the output opening.

6. The crop harvester of claim 5, wherein the collection chamber further includes a receiving tray associated with the input port and including a downwardly inclined side, terminating above the collector conveyance for delivering the crop from the input opening to the collector conveyance.

7. The crop harvester of claim 1, the universal collector and transfer mechanism further comprising:
   a. a first framework for supporting the means for conveying the collected, separated crop adapted to be releasably mounted on the vehicle;
   b. a second framework for supporting the means for collecting the harvested crop and separating the trash therefrom and adapted to be releasably mounted on the first framework; and
   c. a harvester framework for supporting the harvesting implement and adapted to be releasably mounted on said second framework.

8. The crop harvester of claim 7, further including a plurality of harvesting implements each adapted for harvesting a specific crop and each mounted in a harvester framework; each of said harvester framework adapted to be selectively, releasably mounted on said second framework.

9. The crop harvester of claim 7, the vehicle including a three-point hitch and said first framework adapted to be carried by said three-point hitch.

10. The crop harvester of claim 7, said second framework further including a hanger support, whereby said second framework may be hung on said first framework.

11. The crop harvester of claim 10, wherein the inclined support on said second framework includes a plurality of female sockets and wherein the inclined supports on said harvester framework includes a plurality of male pins complementary with and adapted to be received by said sockets for positioning and securing said harvester frame relative to said second frame.

12. The crop harvester of claim 11, wherein said upstanding wall includes a hanger support adapted to be received in the upwardly extending support of said second frame, whereby said harvester implement may be hung on said second frame.

13. The crop harvester of claim 7, said second framework further including an outwardly extending, inclined support extending forward of said second framework and upwardly extending support mounted on said inclined support and adjacent said collecting means for defining an input point on said collecting means; and wherein said harvesting implement is supported in a harvester framework having an inclined support and an upstanding wall complementary with and adapted to be received by the inclined support and upwardly extending support on said second framework for supporting the harvester and positioning the harvester relative to said second framework.

14. The crop harvester of claim 1, wherein said crop harvester is adapted to be placed behind said vehicle and wherein said vehicle further includes a main drive axle, the harvester implement including a crop pick-up point which is in substantially the same plane as the main drive axis of the vehicle.

15. The crop harvester of claim 1, wherein said vehicle further includes a vehicle operator station, the harvester implement including a crop pick-up point which is in substantially the same plane as the main drive axis of the vehicle.

16. The crop harvester of claim 1, said harvester implement further comprising:
   a. a raised end for defining a crop exit point;
   b. an opposite lower end disposed adjacent the ground for defining a crop pick-up point;
   c. a first endless belt mounted on said harvester implement and disposed in front of said pick-up point;
   d. means for driving the first endless belt in a direction for feeding crops toward the pick-up point;
   e. a second endless belt mounted on said harvester implement and defining a crop path having opposite ends, with one end at said pick-up point and one end at said collector and transfer mechanism; and
   f. means for driving the second endless belt in a direction for conveying crops from the pick-up point to the collector and transfer mechanism.

17. The crop harvester of claim 16, the harvester implement further including a deflector mounted on said harvester implement between said first and second belts for guiding crops onto said second belt.

18. The crop harvester of claim 17, said second endless belt further comprising crop picking tools mounted on said belt and adapted for removing leguminous crops from said plants as the crops and plants are introduced at the pick-up point and guided onto said second belt.

19. The crop harvester of claim 1, the harvester implement further including an endless belt mounted for defining an elongated path having opposite ends defining a crop pick-up point and a crop-exit point, means for driving the endless belt for advancing harvested crop from the pick-up point to the crop-exit point and crop picking tools mounted on said belt and adapted for removing leguminous crops from said plants as the crops and plants are introduced at the pick-up point and guided onto said second belt.

20. The crop harvester of claim 19, each crop picking tool comprising an upwardly extending, resilient finger.

21. The crop harvester of claim 20, including a plurality of said fingers disposed on said belt and adapted for combing the crops from said plants as they are advanced along said belt.

22. The crop harvester of claim 20, each finger including a cylindrical base, attached to said belt, a tapered transition section, a cylindrical shank coaxial with said base and of smaller outside diameter than the base and a cylindrical, flexible coaxial tip of an outside diameter smaller than the outside diameter of the shank.

23. The crop harvester of claim 22, each finger further including a second, tapered transition section between said shank and said tip.

24. A crop picking finger of the type adapted for mechanically harvesting "gourmet-type" leguminous vegetable crops from a plant, a plurality of fingers adapted to be placed on a moving web and brought into contact with the plant for combing the crops therefrom, each of said fingers comprising a cylindrical base, attached to said belt, a tapered transition section, a cylindrical shank coaxial with said base and of smaller outside diameter than the base and a cylindrical, flexible coaxial tip of an outside diameter smaller than the outside diameter of the shank.

25. The crop harvester of claim 24, each finger further including a second, tapered transition section between said shank and said tip.

26. The crop harvester of claim 25, wherein each finger is constructed of a soft, resilient material.

27. A crop harvester for mechanically picking "gourmet-type" leguminous vegetable crops from a plant, comprising:
   a. a raised end for defining a crop exit point;
   b. an opposite lower end disposed adjacent the ground for defining a crop pick-up point;
   c. a first endless belt mounted on said harvester implement and disposed in front of said pick-up point;
   d. means for driving the first endless belt in a direction for feeding crops toward the pick-up point;
   e. a second endless belt mounted on said harvester implement and defining a crop path having opposite ends, with one end at said pick-up point and one end at a transfer point;
   f. means for driving the second endless belt in a direction for conveying crops from the pick-up point to the transfer point; and
   g. crop pick-up tools mounted on said second belt for removing leguminous crops from said plants as the crops and plants are introduced at the pick-up point and guided onto said second belt, each of said tools comprising an upwardly extended, resilient finger having a cylindrical base attached to said belt, a tapered transition section, a cylinder shank coaxial with said base and of a smaller outside diameter than the base and a cylindrical, flexible coaxial tip of an outside diameter smaller than the outside diameter of the shank.

28. The crop harvester of claim 27, further including a deflector mounted on said harvester implement between said first and second belts for guiding crops onto said second belt.

29. The crop harvester of claim 27, each finger further including a second, tapered transition section between said shank and said tip.

* * * * *